D. Robinson.
Horse Rake.
N° 34848  Patented Apr. 1, 1862.
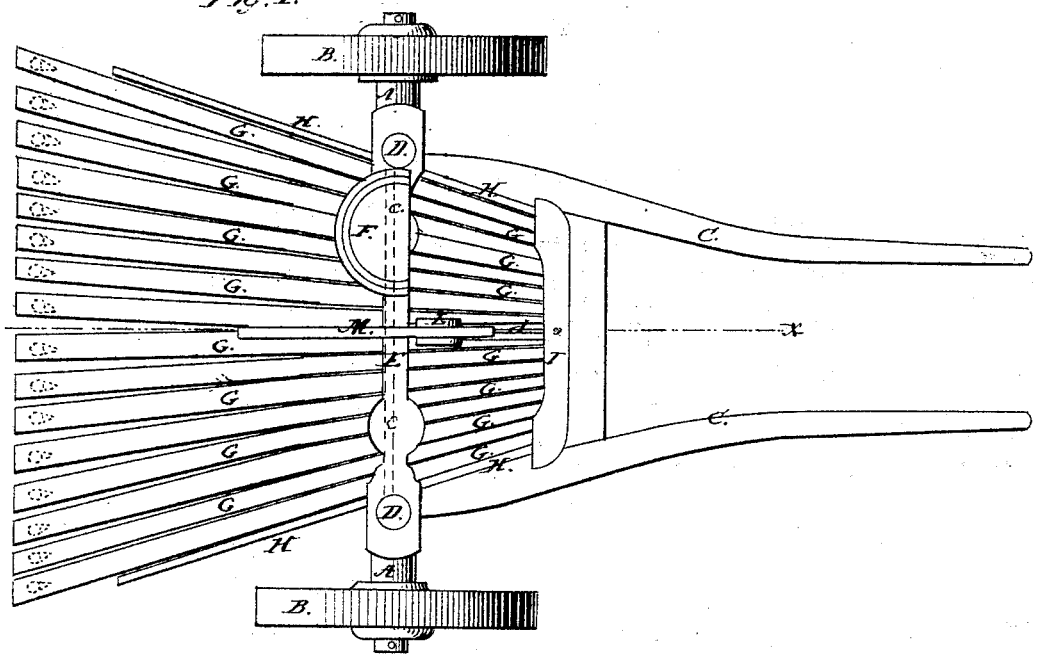
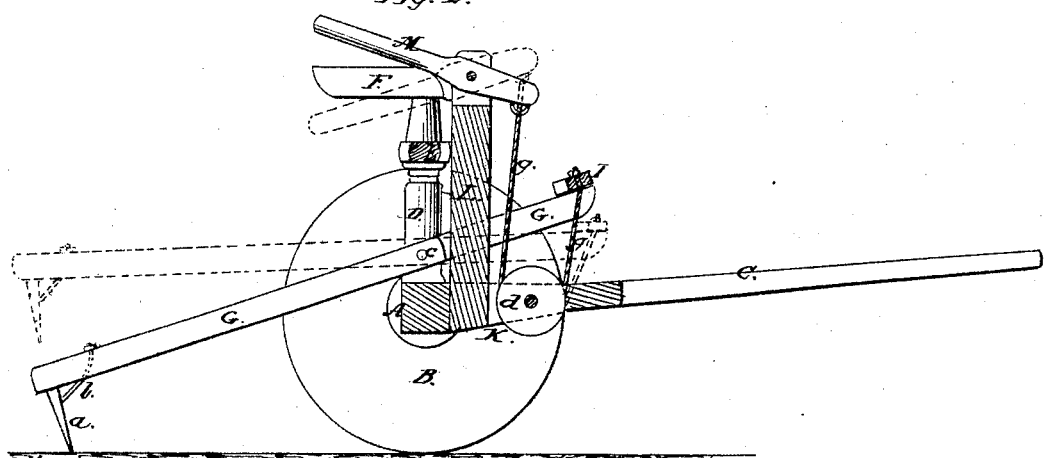

UNITED STATES PATENT OFFICE.

DYER ROBINSON, OF READING CENTRE, NEW YORK.

IMPROVEMENT IN HAY-RAKES.

Specification forming part of Letters Patent No. 34,848, dated April 1, 1862.

*To all whom it may concern:*

Be it known that I, DYER ROBINSON, of Reading Centre, in the county of Schuyler and State of New York, have invented a new and useful Improvement in Horse Hay-Rakes; and I do hereby declare that the following is a full, clear, and exact description thereof, reference being had to the accompanying drawings, making a part of this specification, in which—

Figure 1 is a plan view of the improved horse-rake. Fig. 2 is a longitudinal section through Fig. 1 in the vertical plane indicated by red line $x\ x$ therein.

Similar letters of reference indicate corresponding parts in both figures.

This invention relates to an improvement in that class of horse hay-rakes wherein the raking-teeth are attached to a series of pivoted bars, which will yield separately when their teeth meet with obstructions and allow the teeth to pass over the obstructions without being injured.

To enable those skilled in the art to make and use my invention, I will proceed to describe its construction and operation.

A is an axle-tree carrying on its ends the carriage-wheels B B, which support the entire raking apparatus.

C are the thills, which are secured to and which project out in front of the axle-tree A.

D D are strong posts, which project up perpendicularly from each end of the axle-tree A, and across the tops of these posts a horizontal bar, E, is rigidly secured. This bar E supports the driver's seat F, and it also serves as a brace for the two uprights posts D D to keep them steady.

G G G G are the rake-bars, which are made quite long and tapering from their rear ends to their front ends, as shown in Fig. 1 of the drawings. Each bar G carries on its rear end a tooth, $a$, which projects down perpendicularly from the bar and is secured by a diagonal brace-rod, $b$. (Shown in Fig. 2 of the drawings.) These bars G are all arranged side by side and pivoted between the posts D D by a horizontal rod, $c$, which passes from post to post through each bar G, and connects these bars G to the carriage. The rear ends of rods G project out some distance behind the carriage, so that these rear ends of all the rods G will have a preponderance over their front ends, which project in front of the carriage but a short distance. The bars G will therefore keep the ends of teeth $a$ down on the surface of the ground, and should any one of the teeth $a$ meet with an obstruction its bar G will rise and allow the tooth to pass over the obstacle.

On each side of the series of bars G G are flat bars H H, which are pivoted by the rod $c$ to the posts D D. These side bars, H H, are employed for two purposes—viz., to keep the bars G G G together, and also to carry a board, I, across their front ends, against which board the extreme front ends of all the bars G bear upward, so that by depressing this board I it will elevate the rear ends of all the bars G together.

K is a bar which is mortised into the middle of the axle A, and which projects out in front of this axle and carries on its front end a grooved wheel, $d$. Behind this wheel $d$ a post, L, is secured to the piece K, which post projects up between two of the bars G G and extends a short distance above the horizontal cross bar E, and in the upper end of this upright post L a lever, M, is pivoted, the rear end or the longest arm of which is within reach of the driver when sitting in his seat F. A strong rope or chain, $g$, is attached at one end to the front end or short arm of lever M and passes down under grooved wheel $d$, and is attached at its other end to the middle of the transverse board I, against which the bars G all bear.

It has been found very difficult and laborious for the driver to raise the rear ends of bars G and keep them raised any length of time and at the same time manage his horse; but by the arrangement herein described very little power will be required to depress the rear end of lever M, which will raise the rear ends of bars G from the ground, and, if desirable, the rear end of lever M may be secured down to bar E by a chain and hook or other means, and in this case the driver can manage his horse with both hands while the rakes are elevated from the ground.

Having thus described my invention, what I claim as new, and desire to secure by Letters Patent, is—

The arrangement of the lever M, pulley $d$, cord $g$, and bar I, with the rake-bars G, posts D D, and thills C C, in the manner and for the purpose herein shown and described.

DYER ROBINSON.

Witnesses:
ISAAC CONKLIN,
LEO SHEPHERD.